US006496901B1

(12) United States Patent
De Martine et al.

(10) Patent No.: US 6,496,901 B1
(45) Date of Patent: Dec. 17, 2002

(54) MAPPING VARIABLE SIZE DATA BLOCKS INTO A FIXED BLOCK STRUCTURE

(75) Inventors: Patrick Albert Lloyd De Martine, Littleton, CO (US); Scott Cary Hammett, Black Hawk, CO (US); Stephen Samuel Zanowick, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/401,644

(22) Filed: Sep. 22, 1999

(51) Int. Cl.⁷ .............................................. G06F 12/00
(52) U.S. Cl. ........................ 711/113; 711/134; 711/203
(58) Field of Search ........................ 711/113, 111, 112, 711/134, 170, 203; 710/61; 703/23; 341/67

(56) References Cited

U.S. PATENT DOCUMENTS

| | | | |
|---|---|---|---|
| 5,297,124 A | 3/1994 | Plotkin et al. ............... 369/32 |
| 5,459,853 A | 10/1995 | Best et al. | |
| 5,465,343 A | * 11/1995 | Henson et al. ............. 711/112 |
| 5,506,979 A | 4/1996 | Menon | |
| 5,517,631 A | * 5/1996 | Machado et al. ........... 711/111 |
| 5,535,372 A | * 7/1996 | Benhase et al. ............. 703/23 |
| 5,551,002 A | * 8/1996 | Rosich et al. .............. 711/134 |
| 5,581,743 A | 12/1996 | Burton et al. | |
| 5,675,332 A | * 10/1997 | Limberg ...................... 341/67 |
| 5,706,461 A | * 1/1998 | Branstad et al. ............ 711/203 |
| 5,724,542 A | 3/1998 | Taroda et al. ............... 711/113 |
| 5,802,598 A | * 9/1998 | Watt ............................ 711/170 |
| 6,018,778 A | * 1/2000 | Stolowitz ..................... 710/61 |
| 6,105,103 A | * 8/2000 | Courtright, II et al. ........ 711/1 |

FOREIGN PATENT DOCUMENTS

| | | |
|---|---|---|
| EP | 0 559 142 | 9/1993 |
| WO | 99 06912 | 2/1999 |

OTHER PUBLICATIONS

High Performance Cooperative Count Key Data/Fixed Block Conversion Mechanism; IBM Technical Disclosure Bulletin, US, IBM Corp., New York, vol. 38, No. 6, Jun. 1, 1995, pp. 333–335.

* cited by examiner

*Primary Examiner*—David Hudspeth
*Assistant Examiner*—Fred F. Tzeng
(74) *Attorney, Agent, or Firm*—Brooks & Kushman P.C.

(57) ABSTRACT

A virtual tape system and method for mapping variable sized data blocks from a host to a fixed sized data block structure of a direct access storage device (DASD) utilizes a buffer between the cache and the host. The control logic operates to access the storage device by transferring data between the cache and the buffer in fixed chunk sizes, and in parallel, transferring data between the host and the buffer in data-chained blocks.

17 Claims, 10 Drawing Sheets

MAPPING VARIABLE SIZE DATA BLOCKS INTO A FIXED BLOCK STRUCTURE

TECHNICAL FIELD

The present invention relates to the mapping of variable size data blocks into a fixed block structure for emulating a tape device with a direct access storage device.

BACKGROUND ART

Emulation of a tape device necessitates the handling of large blocks of data differently than that required for a direct access storage device (DASD) control unit. In a DASD environment, a data-record never exceeds a total data count greater than some finite amount of bytes such as, for example, 64 kilobytes. Tape blocks, on the other hand, may have lengths longer than the finite length that is allowed in a DASD environment, and as such, may exceed the capabilities of the DASD front-end data path counters. For example, for a finite block length of 64 kilobytes, a 16 bit counter may be used. As such, tape blocks, which may be up to, for example 256 kilobytes in length, exceed the capabilities of the 16 bit counter.

For the foregoing reasons, there is a need for a virtual tape system and method for mapping variable size data blocks into a fixed block structure.

DISCLOSURE OF INVENTION

It is, therefore, an object of the present invention to provide a virtual tape system and method for mapping variable sized data blocks from a host into a fixed sized data block structure of a direct access storage device that utilizes a buffer between the cache and the host.

In carrying out the above object, a virtual tape system is provided. The system comprises a cache, a buffer, and control logic. The cache for the direct access storage device is configured to send and receive data in a group of associated (spanned) chunks having a fixed size. The buffer is for transferring data between the cache and the host. The buffer has a size that is greater than the fixed chunk size. The control logic is operative to access the storage device by transferring data between the cache and the buffer in fixed size chunks, and in parallel, transferring data between the host and the buffer in data-chained blocks having a variable size.

In one embodiment, the fixed chunk size is not greater than 64 kilobytes, and the variable block size is not greater than 256 kilobytes. A 16 bit counter is used for counting data transfers between the cache and the buffer. Further, it is preferred that the buffer size is twice the sum of the fixed chunk size and the cyclic redundancy check (CRC) bytes.

In a preferred embodiment, each fixed size chunk has a count, and the control logic is further operative to read from the direct access storage device by initiating a transfer of a series of fixed size chunks from the cache to the buffer. Thereafter, the control logic initiates a transfer of a series of variable size blocks from the buffer to the host while, in parallel, continuing to transfer the series of fixed size chunks from the cache to the buffer. The last chunk in the series of fixed size chunks may have a count less than the fixed chunk size, with the other chunks all having a count equal to the fixed chunk size.

Further, in a preferred embodiment, the control logic is further operative to write to the direct access storage device by initiating a transfer of a series of variable size blocks from the host to the buffer. Thereafter, the control logic initiates a transfer of a series of fixed size chunks from the buffer to the cache while, in parallel, continuing to transfer the series of variable size blocks from the host to the buffer. The last chunk in the series of fixed size chunks may have a count less than the fixed chunk size, with the other chunks having a count equal to the fixed chunk size. Preferably, the buffer size is at least twice the fixed chunk size including room for CRC bytes. Having the buffer at least twice the chunk size (plus room for CRC bytes) allows the buffer to be primed with one full chunk of information before any information is removed from the buffer. This size buffer advantageously allows simultaneous (parallel) transfers into and out of the buffer in either direction (read or write).

Further, in carrying out the present invention, a virtual tape method for mapping variable size data blocks from a host into a fixed data block structure of a direct access storage device is provided. The direct access storage device has a cache configured to send and receive data in a group of associated (spanned) chunks having a fixed size. The method comprises establishing a buffer between the cache and the host for transferring data between the cache and host. The buffer has a size that is greater than the fixed chunk size. The method further comprises accessing the storage device by transferring data between the cache and the buffer in fixed size chunks, and in parallel, transferring data between the host and the buffer in data-chained blocks having a variable size. In one embodiment, the fixed chunk size is not greater than 64 kilobytes and the variable chunk size is not greater than 256 kilobytes.

In a preferred embodiment, the method further comprises reading from the direct access storage device by initiating a transfer of a series of fixed size chunks from the cache to the buffer. Thereafter, a transfer of a series of variable size blocks from the buffer to the host is initiated while, in parallel, the transferring of the series of fixed size chunks from the cache to the buffer continues. The last chunk in the series of fixed size chunks may have a count less than the fixed chunk size, with the other chunks all having a count equal to the fixed chunk size. Further, in a preferred embodiment, the method further comprises writing to the direct access storage device by initiating a transfer of a series of variable sized blocks from the host to the buffer. Thereafter, a transfer of a series of fixed sized chunks from the buffer to the cache is initiated while, in parallel, the transferring of the series of variable size blocks from the host to the buffer continues.

The advantages associated with embodiments of the present invention are numerous. For example, embodiments of the present invention employ a chunking algorithm to map arbitrarily large data blocks of variable size into a fixed block structure. Two data transfer modes, fixed chunk size and variable block size (data-chained), are used in parallel to reconcile the count mismatch between the fixed size chunks and the variable size blocks. For write transfers, commands with the data chaining bit set and any write command with a count greater than the defined chunk size is processed by the chunking algorithm. Read transfers are processed as chunks when instructed to do so by the control unit processor via messaging.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
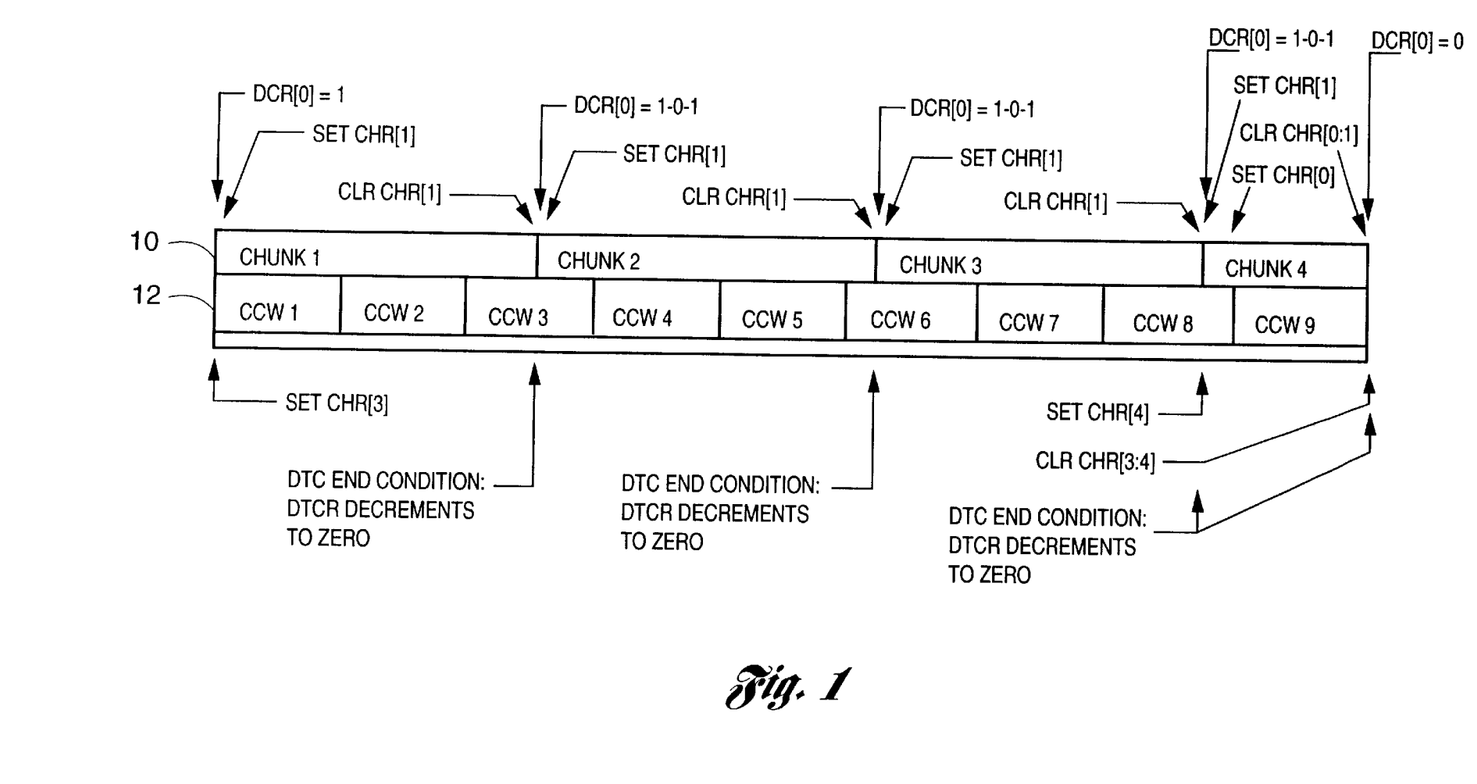
FIG. 1 is a diagram illustrating a data chaining chunked read with a channel command word count less than the fixed chunk size.
Figure 2:
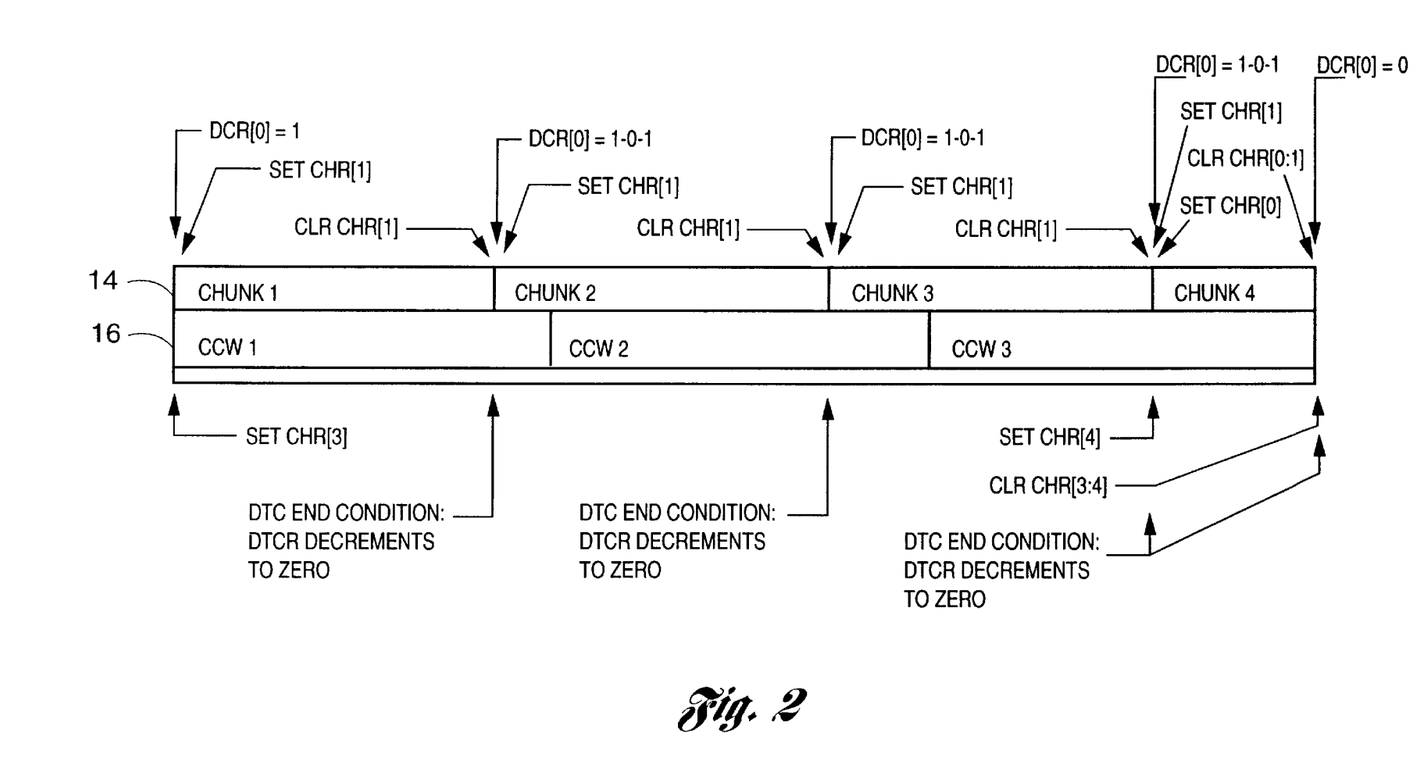
FIG. 2 is a diagram illustrating a data chaining chunked read with a channel command word count greater than the fixed chunk size.

With reference to FIG. 1, a diagram illustrates data chaining chunked reading when the channel command word count is less than the chunk size. The fixed size chunks, which are being moved from the cache to the buffer, are indicated at 10. The channel command word data/variable size blocks, which are being transferred from the buffer to the host, are indicated at 12. FIG. 2 illustrates data chaining chunked reading when the channel command word count is greater than the chunk size. The fixed size chunks are indicated at 14, and the channel command word count/variable size blocks are indicated at 16. The fixed size chunks are being transferred from the cache to the buffer, and the variable size blocks are being transferred from the buffer to the host.

Figure 3:
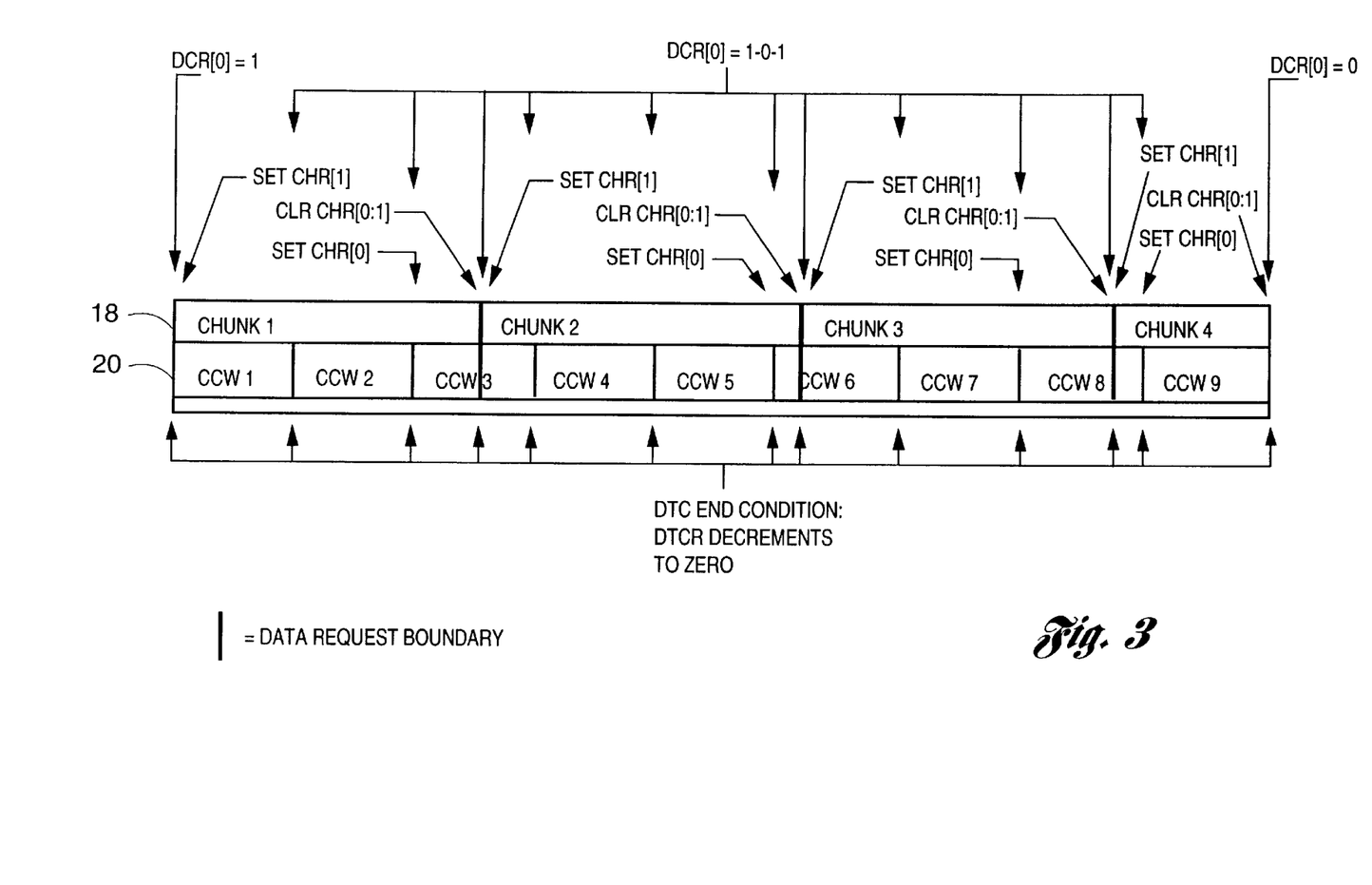
FIG. 3 is a diagram illustrating a data chaining chunked write with a channel command word count less than the fixed chunk size.

In FIG. 3, a diagram illustrates data chaining chunked writing with a channel command word count less than the fixed chunk size. The fixed size chunks are indicated at 18, while the channel command word count/variable size blocks are indicated at 20. During writing, the fixed size chunks are being transferred from the buffer to the cache, while the variable size blocks are being transferred from the host to the buffer.

Figure 4:
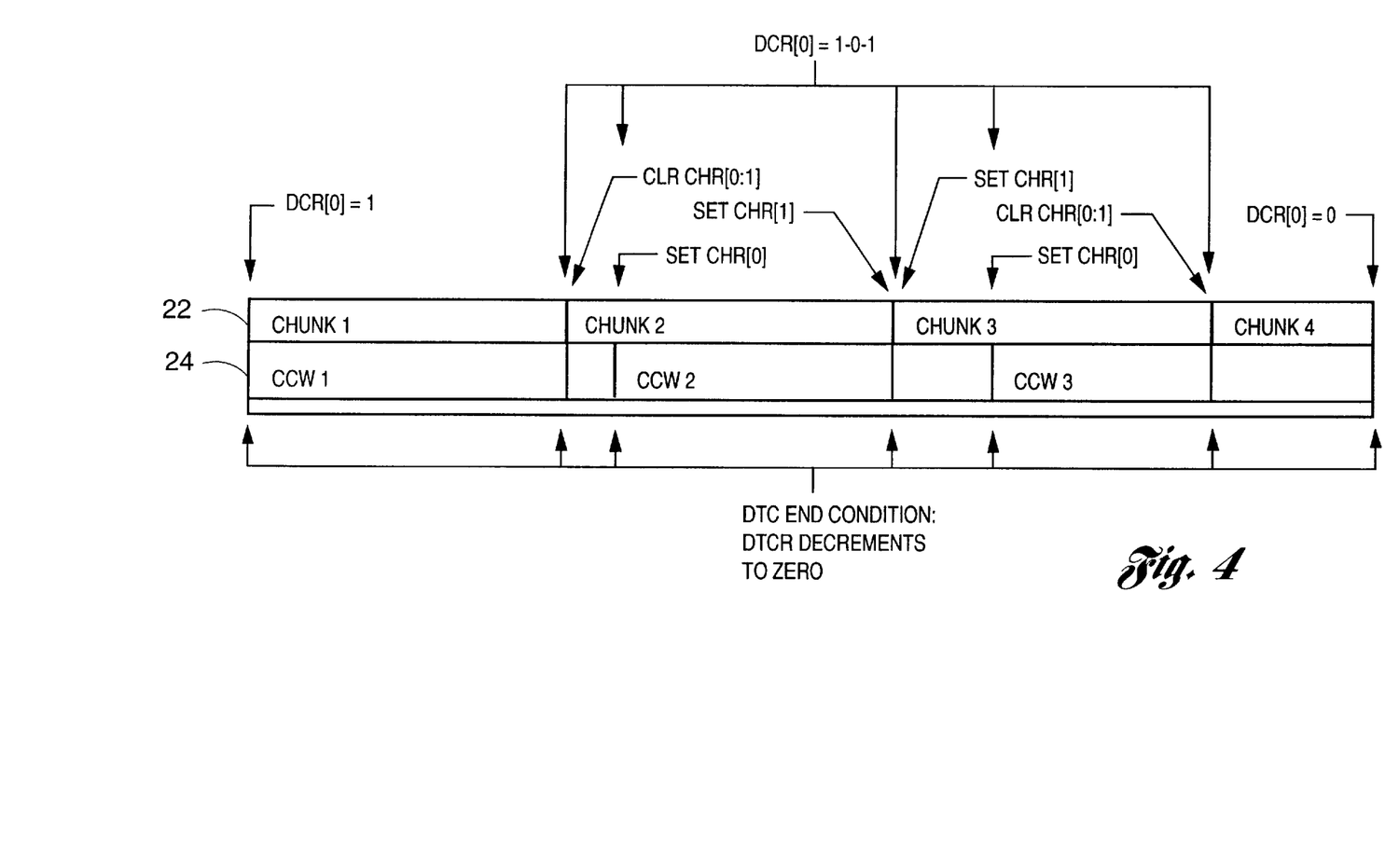
FIG. 4 is a diagram illustrating a data chaining chunked write with a channel command word count greater than the fixed chunk size.

In FIG. 4, data chaining chunked writing with the channel command word count greater than the fixed chunk size is illustrated. The fixed sized chunks are indicated at 22, while the variable size blocks are indicated at 24. The fixed size chunks are being transferred, during a write, from the buffer to the cache. And, the variable size blocks are being transferred from the host to the buffer.

Figure 5:
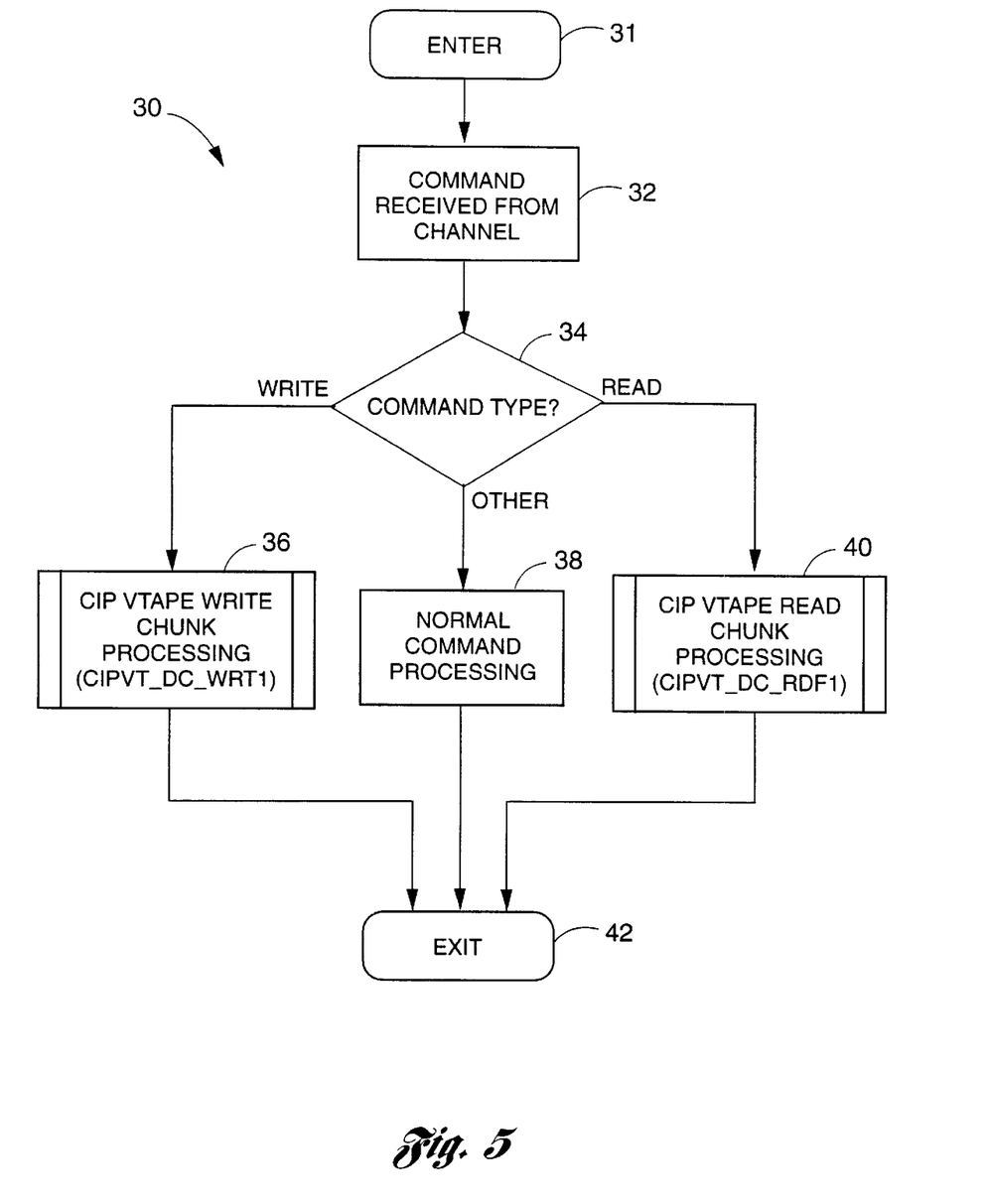
FIG. 5 is a block diagram illustrating a channel interface processor virtual tape data chaining processing method of the present invention.
Figure 6A:
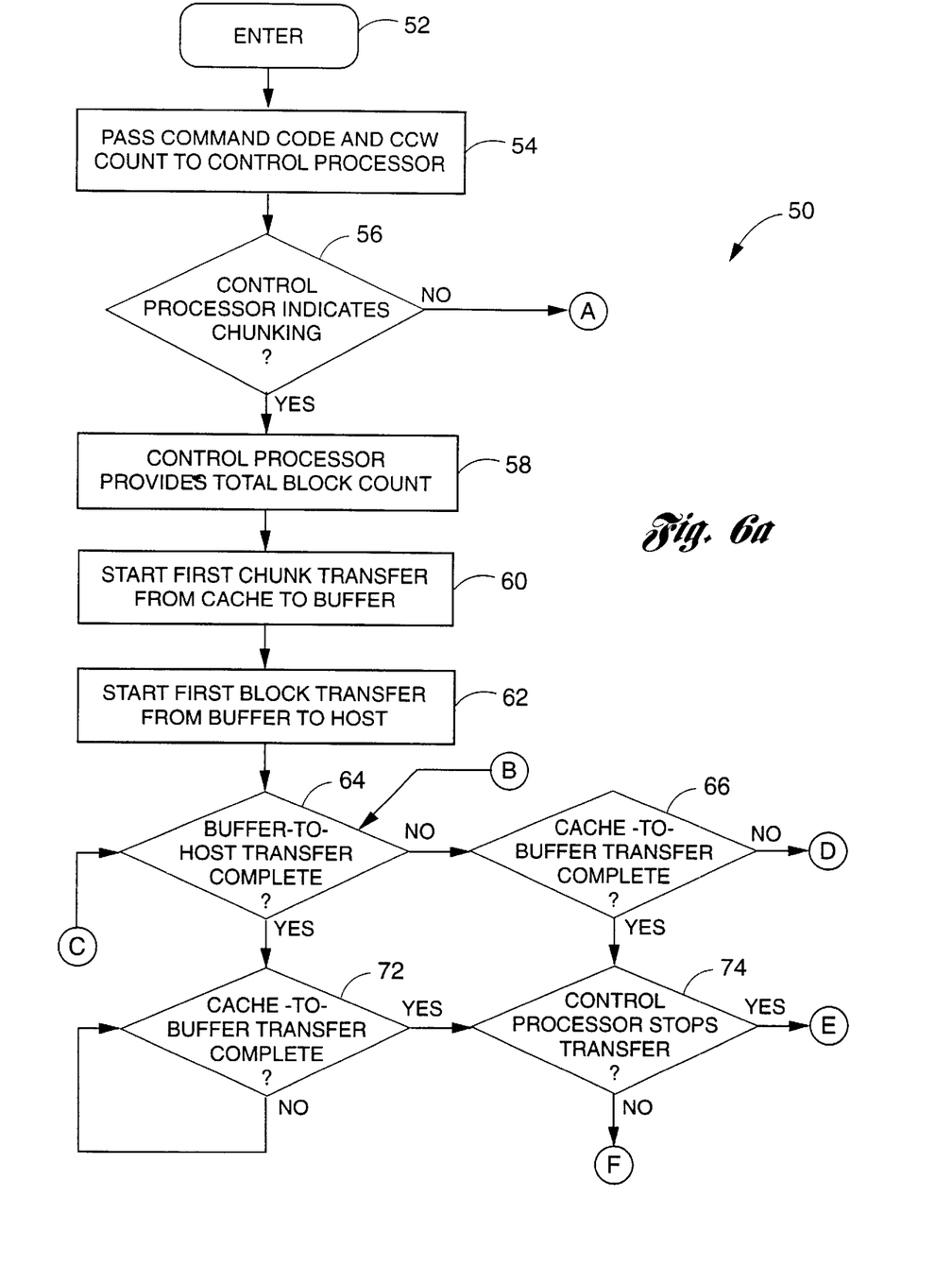
FIGS. 6a–6c are a block diagram illustrating a channel interface processor virtual tape data chaining read processing method of the present invention.
Figure 6B:
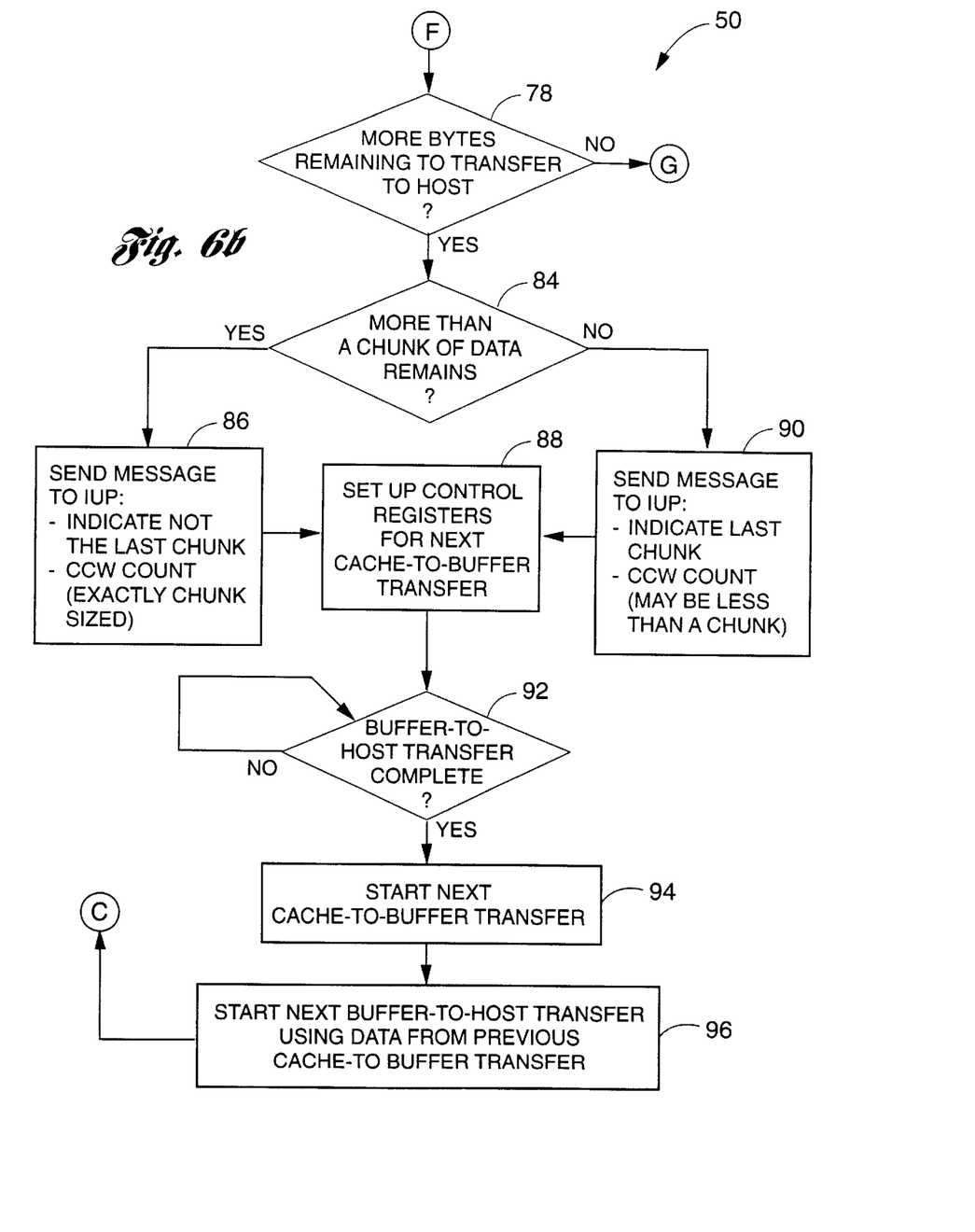
Figure 6C:
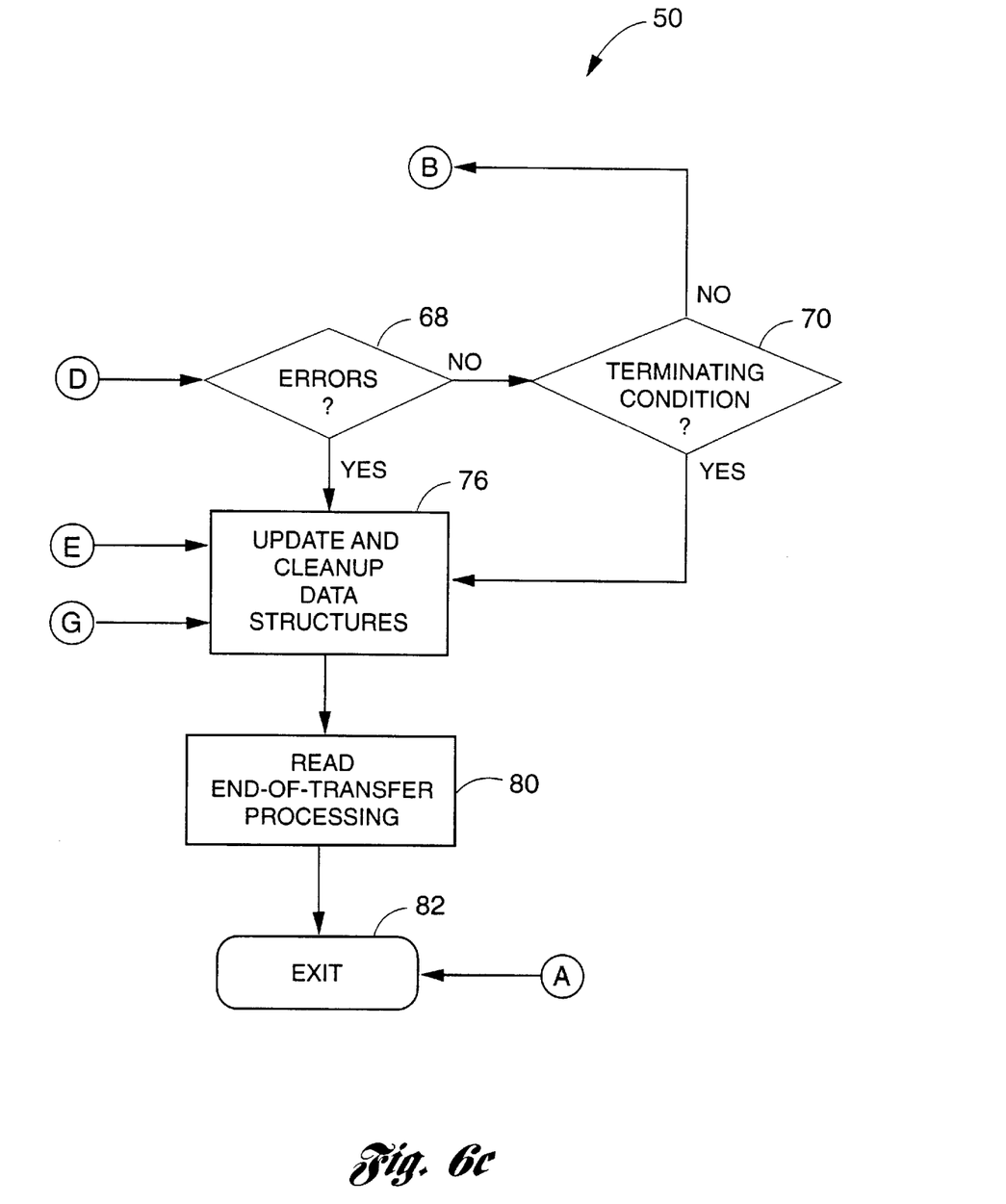
Figure 7A:
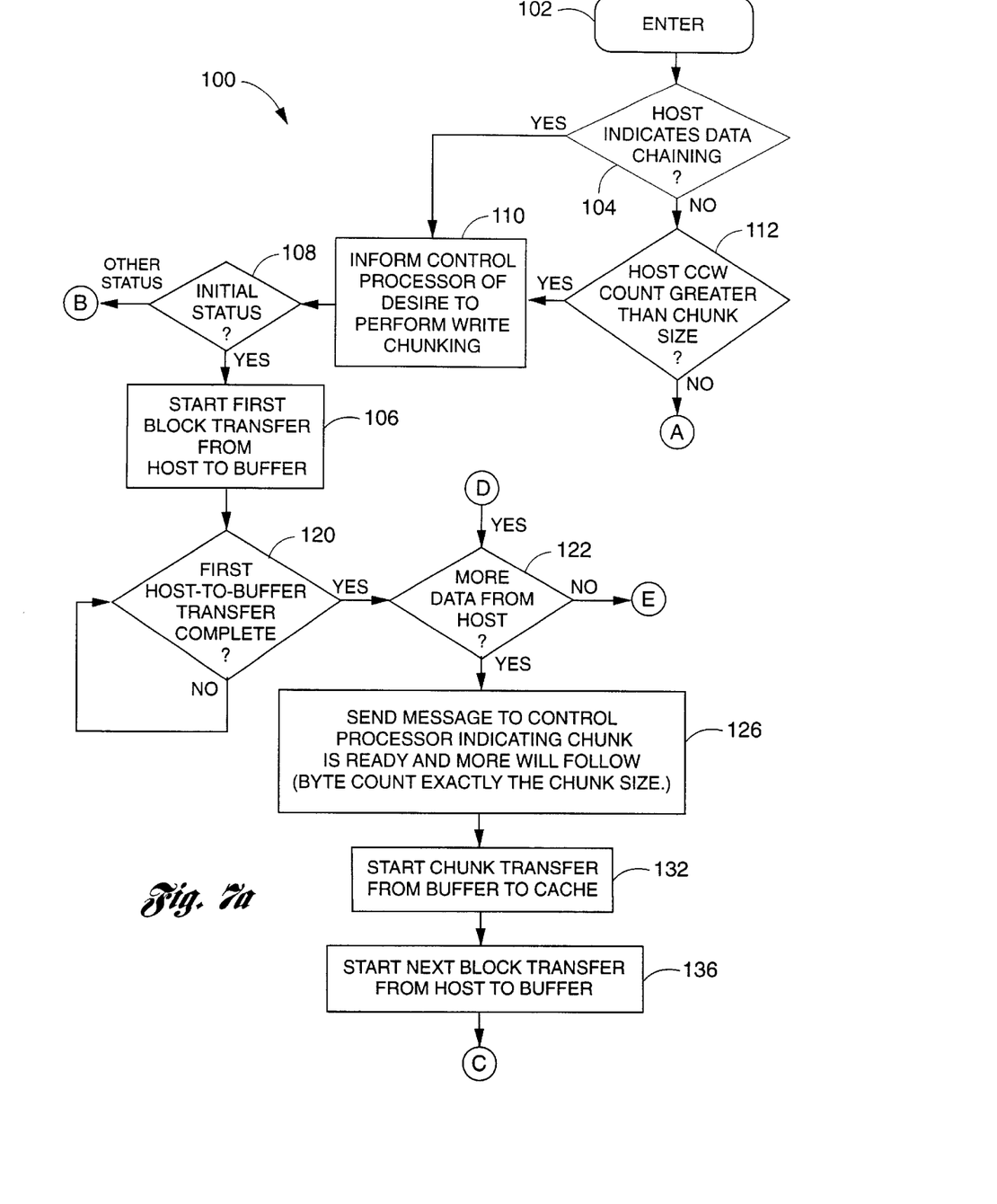
FIGS. 7a–7b are a block diagram illustrating a channel interface processor virtual tape data chaining write processing method of the present invention.
Figure 7B:
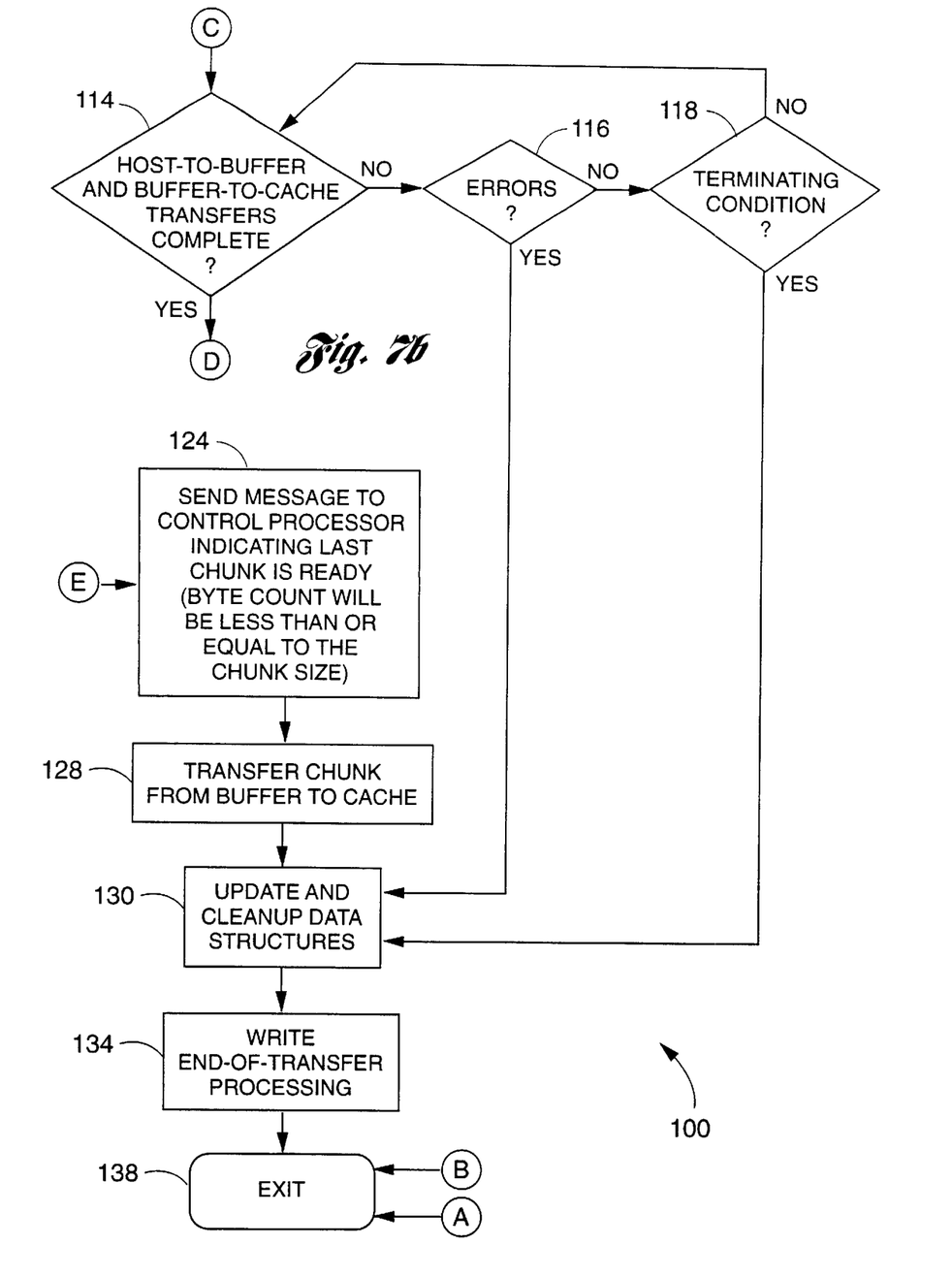

The diagrams of FIGS. 1–4 are best understood when viewed along side the block diagrams of FIGS. 5–7. In FIG. 5, a block diagram illustrating the data chaining process is generally indicated at 30. At 31, the top level mapping code for read and write commands is entered. At block 32, a valid command is received on the input/output (I/O) channel. At block 34, a command type is determined as indicated by the command field of the received command frame (packet). At block 36, if the command is a write, chunk processing continues as illustrated in FIG. 7. At block 38, when the command is neither a read nor a write, no special mapping is required. At block 40, if the command is a read (forward), mapping may be required and takes place as shown in FIG. 6. After either chunk processing of a virtual tape write (block 36), normal command processing (block 38) or chunk processing of a virtual tape read (block 40), the process ends at block 42.

In FIG. 6, at block 52, read mapping is entered (from block 40 of FIG. 5). At block 54, command code and byte count are passed to the control processor. At block 56, if this data block had been written using the mapping process, a message indicating so is received from the control processor and the mapping code is entered. If the block was not mapped when written, normal command processing indicators are received. At block 58, when mapping has been used, the control processor passes the total byte count of the mapped block.

The total byte count of the mapped block is used to anticipate actions when de-mapping the block. As an example, if the host computer does not need the full block, it will truncate the read (only read a portion of the total data block). If the truncation occurs in the middle of a chunk, the remainder of the chunk must still be extracted from the cache so that error checking can be performed. For example, cyclic redundancy checking (CRC) may be performed. Another example where total byte count of the mapped block may be used is when the host computer attempts to read more data than is in the data block. In this case, the channel interface processor would detect this because it knows the data block bytes available.

At block 60, the channel interface processor sets up and starts the first chunk transfer from the cache to the buffer. At block 62, once the cache to buffer data transfer is started, the channel interface processor immediately sets up and starts transfer from the buffer to the host. Of course, in a preferred embodiment, the buffer to host transfer is not started until one full fixed sized chunk has been moved into the buffer, and the buffer preferably has a size that is at least twice the size of the chunks including room for CRC bytes. Despite the standard chunks used to write and read data from the cache, the channel interface processor will de-map the data and present it in any way specified by the host computer.

The host computer has a number of mechanisms for breaking data into pieces. A data block can be broken into a number of commands (referred to as data chaining). Each command can be further divided by requesting a portion of the data specified in the command (referred to as data request). For example, a 64 kilobyte block could be requested in the following ways: One 64 kilobyte command and one 64 kilobyte data request per command, one 64 kilobyte command and two 32 kilobyte data requests per command, two 32 kilobyte commands and one 32 kilobyte data request per command, two 32 kilobyte commands and two 16 kilobyte data requests per command, 64 one kilobyte commands and 64 sixteen byte data requests per command, and so on.

At block 64, status of the buffer to host transfer is checked. The status is determined by a hardware indicator that activates when the buffer to host transfer set up in block 62 is completed. If the buffer to host transfer is not complete, flow proceeds to block 66. At block 66, the cache to buffer transfer is checked for completion via a hardware indicator. If the cache to buffer transfer is not complete, flow proceeds to block 68 where it is checked to see if any errors have been detected with any of the transfers. Errors include, but are not limited to, channel protocol errors, CRC errors, control processor detected errors, hardware malfunctions and so on. If there are no errors, flow proceeds to block 70. At block 70, both data transfers are checked to see if any terminating conditions have occurred. Terminating conditions do not necessarily indicate an error, only that there is some condition which overrides the completion of the data transfer. These conditions include, but are not limited to: cancel or reset requests from the host, command retry from the control processor or the host, and so on.

If the buffer to host transfer had completed at block 64, flow proceeds to block 72. Flow remains at block 72 until the cache to buffer transfer is complete, which is determined by a hardware indicator that activates when a value set up in block 60 is satisfied. Thereafter, at block 74, it is checked to see if the control processor is stopping the data transfer. If the control processor determines that there are problems with the data transfer or if it needs the command reissued by the host computer, it will indicate this by writing specific values to specific hardware registers. At block 76, which is proceeded to when the control processor stops the transfer, the chunk data transfer is considered over and all control data is reset and counters are placed in a quiescent state.

If the control processor did not stop the data transfer at block 74, flow proceeds to block 78 where it is checked to see if there is still more data available to send and if so, does the host want them. This check is based on the total byte count of the data block received at block 58 and the accumulated count of bytes sent successfully to the host computer. If the host does not want any more bytes of data, flow proceeds to block 76. At block 76, arriving there from either block 74 or 78, data structures are updated and cleaned up as explained above. Flow then proceeds to block 80, where the channel interface processor presents ending status for the data transfer to the host computer. This status is supplied by the control processor. Thereafter, at block 82, the mapping code is exited and processing returns to normal I/O processing.

In the event that the host wants more bytes at block 78, flow proceeds to block 84. At block 84, based on the total byte count of the data received at block 58, the accumulated counts of bytes sent successfully to the host computer, and the defined chunk size, it is determined if there is more than a chunk of data still available to send to the host computer. If there is more than a chunk of data remaining, flow proceeds to block 86. At block 86, a message is sent to the control processor indicating that another chunk of data is required for cache to buffer transferring. Also, the host computer has not given any indication that the transfer is going to complete early, so this is not the last chunk needed. Thereafter, at block 88, the channel interface processor sets up, but does not start, the next chunk transfer from the cache to the buffer. If at block 84, it was determined that there was not more than a chunk of data remaining, flow proceeds to block 90. At block 90, a message is sent to the control processor indicating that another chunk of data is required for cache to buffer transferring and that it is the last chunk for this data block. The byte count for the last chunk may vary from one byte to the full chunk size. This count is also passed to the control processor.

Eventually, flow proceeds to block 92. At block 92, if the buffer to host data transfer is still in progress (flow had proceeded through block 66 as opposed to through block 72), processing now waits for that transfer to complete. Thereafter, flow proceeds to block 94. At block 94, the channel interface processor starts the next chunk transfer from the cache to the buffer. And thereafter, at block 96, once the cache to buffer data transfer started, the channel interface processor immediately sets up and starts transfer from the buffer to the host. Of course, as mentioned previously, buffer to host transfer is preferably not started until there is at least one fixed chunk size amount of data in the buffer. This amount of data may already be in the buffer, if the buffer was primed at block 60. After block 96, flow proceeds to block 64 and the data chaining read processing continues until eventually exit block 82 is reached.

Referring to FIG. 7, virtual tape data chaining writing processing is entered at block 102, with flow proceeding to block 104. At block 104, it is checked to see if the host has the data chaining indicator turned on. If the host indicates data chaining, flow proceeds to block 110, otherwise, flow proceeds to block 112. At block 112, if the data chaining indicator is not received from the host, but the number of bytes to be written is greater than the fixed chunk size, then the write must be mapped and flow proceeds to block 110. Otherwise, flow proceeds to exit block 138 which returns processing to FIG. 5.

With continuing reference to FIG. 7, at block 110, the channel interface processor passes the data transfer command to the control processor with an indicator that specifies that this write must be mapped into fixed size chunks. Flow proceeds to block 108 where at it is checked to see if initial status has been received from the control processor.

Initial status is indicated by the control processor writing a value of zero to a specific hardware register. If initial status is found, flow proceeds to block 106, where counters and control information are set up and the first block transfer from host to buffer is started. Flow then proceeds to block 120. At block 120, processing waits for the first host to buffer transfer to complete (the buffer is primed). Thereafter, flow proceeds to block 122. If there is more data to be transferred for this write command, flow proceeds to block 126, otherwise, flow proceeds to block 124. This is determined by examining the data chaining bits in the current write command. These bits will show the host's intention to send another data chained command. Also, more data is expected if there is still outstanding data for the current data chain command.

When there is more data from the host, at block 126, a message is sent from the channel interface processor to the control processor indicating that the next, or the first if flow arrived here from block 120 as opposed to from block 114, (but not the last) chunk for this data transfer is ready for buffer to cache transferring. The byte counter for this transfer will be exactly a chunk in size. At block 132, the transfer from buffer to cache is set up and started. At block 136, counters and control information are set up, and the next chunk transfer from host to buffer is started. Thereafter, flow proceeds to block 114.

At block 114, hardware signals that activate when the data transfers set up in blocks 132 and 136 are satisfied are checked to see if the host to buffer and buffer to cache transfers are complete. If not, flow proceeds to block 116 where a check for errors is performed. Error checking includes, but is not limited to: channel protocol errors, CRC errors, control processor detected errors, hardware malfunctions, and so on. If there are not any errors, flow proceeds to block 118.

At block 118, it is checked to see if there are any terminating conditions. Terminating conditions do not necessarily indicate an error, only that there is some condition which overrides the completion of the data transfer. These conditions include, are not limited to: cancel or reset request from the host, command retry from the control processor or the host, and so on. If there are no terminating conditions, flow returns to block 114. If errors were found at block 116 or terminating conditions have occurred at block 118, flow proceeds to block 130 and the chunk data transfer is considered over and all control data is reset and counters are placed in a quiescent state.

If flow had returned to block 114, it is again checked to see if the host to buffer and buffer to cache transfers are completed. Upon completion of both transfers, at block 122, it is again checked to see if there is more data from the host (as checked previously). If so, flow again proceeds to block 126, to block 132, and then to block 136 as described previously.

The writing processing cycle continues until at block 122, it is indicated that there is no more data from the host, then flow proceeds to block 124 (assuming no errors or terminating conditions occurred). At block 124, a message is sent from the channel interface processor to the control processor indicating that the last chunk for this data transfer is ready for buffer to cache transfer. The byte count for the last chunk can vary from one to the full chunk size.

Flow then proceeds to block 128, where the transfer from buffer to cache is set up and started. Flow then proceeds to block 130, where the chunk data transfer is considered over and all control data is reset and counters are placed in a quiescent state.

Thereafter, at block 134, the channel interface processor presents ending status for the data transfer to the host computer. This status is supplied by the control processor. Thereafter, flow proceeds to block 138, and then processing returns to FIG. 5.

It is to be appreciated that embodiments of the present invention use a software method, chunking, to map arbitrarily large data blocks of variable size to fixed chunks which can be handled by the currently existing counters. To accomplish this, commands which require chuncking are intercepted from the baseline channel interface processor code and processed by the mapping function. For normal non-data-chained transfers, channel command word counts (host to buffer and buffer to host) and cache transfer counts (cache to buffer and buffer to cache) can be managed in unison. For data chaining, this is not the case. Because of the fixed nature of the chunk and the unpredictable size of the channel command word counts, it must be assumed that the boundaries of the two portions of the host to cache transfer will not coincide. Two data transfer modes are used in parallel to reconcile this count mismatch in accordance with the present invention.

In summary, during a read, chunks are moved from cache to the buffer, to get the buffer primed. The buffer preferably is at least twice the chunk size including room for CRC bytes so that the buffer can accommodate two chunk transfers in parallel. Data is moved from the buffer to the host in block sizes based on the channel command word (variable or unpredictable), while the hardware error correction is performed in accordance with the chunk size as the data moves into the buffer. The last chunk may be a short chunk to match up with the final channel command word count.

During a write, blocks are moved from the host to the buffer, to get the buffer primed. Data is moved from the buffer to the cache in chunks of a fixed size, while blocks enter the buffer in block sizes based on the channel command word count. It is to be appreciated that in accordance with the present invention, there are two simultaneous direct transfers occurring (after any latency for prefetch into the buffer). One of the transfers is the transfer between the cache and the buffer, and the other transfer is a transfer between the buffer and the host. Advantageously, manipulating control register values (as best shown in FIGS. 1–4) makes the parallel dual transferring possible, and transparent, to the host.

In accordance with the present invention, hardware registers are controlled during the transfer. The below listed description of registers and register changing commands, when taken in connection with FIGS. 1–4, describes embodiments of the present invention in further detail.

DTC active=Enable/disables the Data Transfer Controller.
DTC Read/Write=Selects the direction of the data transfer.
New NDRC=Signals the hardware that a new data request count is available to add to the current transfer in progress.
NDRC E bit—Signals to the hardware that this new data request count exactly satisfies the host computer's final data request.
CKD mode=Tells the hardware that it must package multiple cache-to-buffer transfers into a single buffer-to-host transfer.
Terminate CKD Mode=Used to inform the hardware of the last cache-to-buffer transfer when in CKD mode.
Data Chaining Mode=Signals the hardware that multiple commands (multiple buffer-host transfers) will be needed for the transfer of the data block.
Terminate Data Chaining=Used to inform the hardware of the last buffer-host transfer when in data chaining mode.
"DCR[0]=1" means to set bit 0 of the DCR register to a value of one. This starts the data transfer.
"DCR[0]=1-0-1" means to toggle DCR bit 0 from a value of one, to a value of zero, and then back to one. This results in a momentary suspension of the data transfer.
"Set CHR[1]" tells the DTC hardware that the transfer is going to be data-chained.
"Set CHR[3]" tells the hardware that there will be more than one field of data (a group of bytes with its associated CRC code) coming from the cache in order to satisfy this data transfer. This is referred to as CKD mode.
"CLR CHR[3:4]" indicates that the "CKD Mode" and "Terminate CKD Mode" bits (respectively) should be cleared (turned off). This is done as clean-up at end of the transfer.
"CLR CHR[0:1]" indicates that the "Terminate Data Chaining" and "Data Chaining" bits (respectively) should be cleared (turned off). This is done as clean-up at end of the transfer.
"SET CHR[0]" indicates that the "Terminate Data Chaining" bit should be turned on.
"DCR[0]=0" indicates that the "DTC Active" bit should be turned off. This stops the DTC hardware.

Of course, it is appreciated that embodiments of the present invention are suitable for numerous applications where variable sized data blocks from a host are mapped into a fixed sized data block structure of a direct access storage device (DASD). And accordingly, the above specific description of hardware register operation, which is further illustrated in FIGS. 1–4, is one specific example of an implementation of the present invention, and it is appreciated that the flow diagrams of FIGS. 5–7, and the broader description given further above, encompass other techniques than the specific implementation illustrated. Still further, in one implementation, the buffer between the host and the cache is implemented as a first-in-first-out (FIFO) buffer. Of course, many buffer types are suitable for embodiments of the present invention, with a FIFO buffer being just one example.

While the best mode for carrying out the invention has been described in detail, those familiar with the art to which this invention relates will recognize various alternative designs and embodiments for practicing the invention defined by the following claims.

What is claimed is:

1. A virtual tape system for mapping variable sized data blocks from a host into a fixed size data block structure of a direct access storage device, the system comprising:

a cache for the direct access storage device, the cache being configured to send and receive data in fixed chunks having a fixed size;

a buffer between the cache and the host for transferring data between the cache and the host, the buffer having a buffer size that is greater than the fixed chunk size; and control logic operative to access the storage device by transferring data between the cache and the buffer in fixed size chunks, and in parallel, transferring data between the host and the buffer in data-chained blocks.

2. The system of claim 1 wherein the fixed chunk size is not greater than 64 kilobytes.

3. The system of claim 2 wherein the variable chunk size is not greater than 256 kilobytes.

4. The system of claim 2 wherein the control logic further comprises:

a 16 bit counter for counting data transfers between the cache and the buffer.

5. The system of claim 1 wherein each fixed size chunk has a count, and wherein the control logic is further operative to:

read from the direct access storage device by initiating a transfer of a series of fixed size chunks from the cache to the buffer, and thereafter, initiating a transfer of a series of blocks from the buffer to the host while, in parallel, continuing to transfer the series of fixed size chunks from the cache to the buffer.

6. The system of claim 5 wherein the last chunk in the series of fixed size chunks has a count not more than the fixed chunk size, and the other chunks all have a count equal to the fixed chunk size.

7. The system of claim 1 wherein the control logic is further operative to:

write to the direct access storage device by initiating a transfer of a series of blocks from the host to the buffer, and thereafter, initiating a transfer of a series of fixed sized chunks from the buffer to the cache while, in parallel, continuing to transfer the series of blocks from the host to the buffer.

8. The system of claim 7 wherein the last chunk in the series of fixed size chunks has a count not more than the fixed chunk size, and the other chunks all have a count equal to the fixed chunk size.

9. The system of claim 1 wherein the buffer size is at least twice the fixed chunk size including any error correction information.

10. A virtual tape method for mapping variable sized data blocks from a host into a fixed size data block structure of a direct access storage device having a cache configured to send and receive data in fixed chunks having a fixed size, the method comprising:

establishing a buffer between the cache and the host for transferring data between the cache and the host, the buffer having a buffer size that is greater than the fixed chunk size; and accessing the storage device by transferring data between the cache and the buffer in fixed size chunks, and in parallel, transferring data between the host and the buffer in data-chained blocks.

11. The method of claim 10 wherein the fixed chunk size is not greater than 64 kilobytes.

12. The method of claim 11 wherein the variable chunk size is not greater than 256 kilobytes.

13. The method of claim 10 wherein accessing further comprises:

reading from the direct access storage device by initiating a transfer of a series of fixed size chunks from the cache to the buffer, and thereafter, initiating a transfer of a series of blocks from the buffer to the host while, in parallel, continuing to transfer the series of fixed size chunks from the cache to the buffer.

14. The method of claim 13 wherein the last chunk in the series of fixed size chunks has a count not more than the fixed chunk size, and the other chunks all have a count equal to the fixed chunk size.

15. The method of claim 10 wherein accessing further comprises:

writing to the direct access storage device by initiating a transfer of a series of blocks from the host to the buffer, and thereafter, initiating a transfer of a series of fixed size chunks from the buffer to the cache while, in parallel, continuing to transfer the series of blocks from the host to the buffer.

16. The method of claim 15 wherein the last chunk in the series of fixed size chunks has a count not more than the fixed chunk size, and the other chunks all have a count equal to the fixed chunk size.

17. The method of claim 10 wherein the buffer size is at least twice the fixed chunk size including any error correction information.

* * * * *